United States Patent
Ono et al.

[11] Patent Number: 6,148,558
[45] Date of Patent: Nov. 21, 2000

[54] FISHING ROD

[75] Inventors: Hiroyuki Ono, Kanagawa; Yoshihiro Naeki; Teiji Matsubara, both of Tokyo; Hiroshi Oda, Saitama, all of Japan

[73] Assignee: Daiwa Seiko, Inc., Tokyo, Japan

[21] Appl. No.: 09/377,871

[22] Filed: Aug. 20, 1999

Related U.S. Application Data

[63] Continuation of application No. 08/979,868, Nov. 26, 1997, abandoned.

[30] Foreign Application Priority Data

| Nov. 30, 1996 | [JP] | Japan | 8-334597 |
| May 30, 1997 | [JP] | Japan | 9-157861 |
| Sep. 19, 1997 | [JP] | Japan | 9-273854 |

[51] Int. Cl.$^7$ ................................ A01K 87/00
[52] U.S. Cl. .............................................. 43/18.1
[58] Field of Search ............................ 43/18.1, 18.5

[56] References Cited

U.S. PATENT DOCUMENTS

| 1,385,149 | 7/1921 | Rawson | 43/18.1 |
| 3,036,398 | 5/1962 | Gagner | 43/18.1 |
| 3,609,906 | 10/1971 | Johnson et al. | 43/18.5 |
| 3,830,008 | 8/1974 | Johnson | 43/18.1 |
| 3,835,569 | 9/1974 | Gould, III et al. | 43/18.5 |
| 3,947,141 | 3/1976 | Casset | 43/18.1 |
| 4,057,926 | 11/1977 | Cordell, Jr. | 43/18.5 |
| 4,160,607 | 7/1979 | Reichow | 43/18.1 |
| 4,214,395 | 7/1980 | Caldwell, Jr. | 43/18.1 |
| 4,468,270 | 8/1984 | Green | 43/18.5 |
| 4,520,587 | 6/1985 | Wallace | 43/18.1 |
| 4,644,680 | 2/1987 | Dawson | 43/18.1 |
| 5,832,653 | 11/1998 | Tsurufuji | 43/18.1 |

*Primary Examiner*—Michael J. Carone
*Assistant Examiner*—Darren W. Ark
*Attorney, Agent, or Firm*—Liniak, Berenato, Longacre & White

[57] ABSTRACT

A fishing rod with which, even when fishing for large fish or for fish demonstrating strong pulls, fishing can be performed comfortably even if the angler's physical strength is small. The fishing rod is arranged such that a portion of the fishing rod ranging from a portion close to a butt portion of the fishing rod to a rod tip is formed by a solid rod having a region with a fiber-reinforced plastic prepreg in which reinforced fibers are stretched and arranged mainly in one direction is wound around and integrated with a surface of a solid member using a resin as a matrix and reinforced mainly by reinforced fibers generally oriented in an axial direction, in such a manner that a direction of the reinforced fibers of the prepreg is generally oriented in the axial direction.

13 Claims, 8 Drawing Sheets

FISHING ROD

This is a continuation application of Ser. No.: 08/979,868 Filed on Nov. 26, 1997 now abandoned.

BACKGROUND OF THE INVENTION

The present invention relates to a fishing rod having a solid rod section.

Japanese Utility Model Application Publication No. 59-20057 discloses a structure in which a so-called solid member, which is formed solidly by impregnating reinforced fibers arranged in the axial direction with a resin, is used at a tip of a fishing rod. This tip rod section is constructed such that glass fibers with a small modulus of elasticity are used as reinforced fibers of the solid member, and that a prepreg using carbon fibers with a large modulus of elasticity is wound around an outer periphery of a butt portion of the solid member and is formed integrally therewith. It has been the conventional practice to use a solid member as a tip rod section in this manner.

However, as rods for fishing large fish or fish with strong tugs, rod portions ranging from at least a butt rod to a rod portion close to a tip are conventionally formed from hollow rod pipes. The reason for this is that, since a large bending force acts in a butt portion when such fish are caught, the fishing rod must be made capable of withstanding the tugs of the fish by enlarging the bending rigidity of the butt portion to some degree, i.e., by enlarging the diameter to some degree, and that light weight must also be attained. However, the tip of the rod must naturally be made slender. Accordingly, hollow rod pipes which are each manufactured by winding a prepreg around a core are used as rod portions excluding at least a rod portion close to the tip, and these rod portions are generally joined such that they become gradually slender toward the tip, thereby forming a fishing rod of a predetermined length.

However, since the butt portion is formed from a hollow pipe whose bending rigidity is large to some extent and whose diameter is large, if this portion is deflected substantially, the so-called crush breakage occurs. For this reason, the portion close to an angler's hand is structured to be provided with even larger bending rigidity so that the portion close to the hand will not be deflected much. Since the fishing rod thus structured has a large diameter at the butt portion, and a predetermined small diameter at the tip portion, it is natural that, in general, the fishing rod becomes long. For this reason, in terms of the deflected state of the fishing rod in a case where a fish is caught, the fishing rod is deflected substantially from the intermediate portion to the tip, but is not deflected so much from the intermediate portion to the butt portion. Due to the distance from the butt portion to the intermediate portion, even in the state in which a fish is caught and the fishing rod is deflected, the distance from the butt portion being gripped by the angler to the rod tip is long, so that the bending moment acting in the butt portion due to the load of the fish and the like is very large, and the emaciation of the physical strength of the angler who withstands this bending moment is very intense.

In addition, since the carbon fibers wound around the outer periphery of the solid member disclosed in the above-described publication has a modulus of elasticity larger than that of the glass fibers of the solid member, the rigidity of the tip before and behind the position of a front edge of the wound prepreg changes sharply, and the state of deflection before and behind this position changes sharply. Hence, there is a drawback in that the fishing rod is liable to break at this position. In addition, since the kinds of reinforced fibers differ between the solid member and the prepreg wound therearound, the different coefficients of expansions are likely to distort the formed tip.

SUMMARY OF THE INVENTION

In view of the above-described drawback, a first object of the present invention is to provide a joined-type fishing rod which does not break even if a large fish is caught by a slender fishing rod.

A second object of the present invention is to provide a fishing rod with which, even when fishing large fish or fish demonstrating strong tugs, fishing can be performed comfortably even if the angler's physical strength is small.

A third object of the present invention is to provide a fishing rod having a solid rod section in which the deflection before and behind the front edge of the prepreg wound around the solid member is smooth, the concentration of stress is difficult to occur, and the distortion of bending of the formed basic material is difficult to occur.

A first aspect of the present invention is a fishing rod in which a hollow rod pipe is joined to a distal end of a solid rod.

According to the first aspect, since a butt rod is formed by a solid rod and an outer layer or by the solid rod alone, the butt rod can be made a slender butt rod, and a tip rod which is joined to the butt rod can also be made a slender tip rod. As a result, the overall joined-type fishing rod becomes slender, so that the fishing rod operation such as a casting operation is easy to perform.

Moreover, since the tip rod is hollow, it is possible to prevent a heavy hanging down of the rod when the fishing rod is held.

Further, even when a large fish is caught, since the butt rod is formed by the solid rod and the outer layer or by the solid rod alone, it is possible to obtain a tough and high-strength fishing rod which is capable of coping with large deflection and preventing breakage.

A second aspect of the present invention is a fishing rod in which a portion of the fishing rod ranging from a portion close to a butt portion of the fishing rod to a rod tip is formed by a solid rod having a region where a fiber-reinforced plastic prepreg in which reinforced fibers are arranged mainly in one direction is wound around and integrated with a surface of a solid member using a resin as a matrix and reinforced mainly by reinforced fibers generally oriented in an axial direction, in such a manner that a direction of the reinforced fibers of the prepreg is generally oriented in the axial direction.

In the above, "from a portion close to a butt portion" may be "from a rear end of the fishing rod," or may be "from a portion excluding a grip operation portion" (handle portion). Namely, the region where deflection is not expected is arbitrary, but the region where deflection is expected is formed by the solid rod.

The prepreg referred to in this application has a broad meaning which includes not only prepregs using thermosetting resins in general, but also those in a state in which a thermoplastic resin is mixed with reinforced fibers. Accordingly, the concept of a matrix synthetic resin similarly includes resins of both kinds.

If the fishing rod is formed to be not hollow but solid, even if the fishing rod is deflected substantially, crush breakage does not occur. For this reason, in the case of a fishing rod having a hollow rod, it becomes possible to structure the fishing rod in such a manner that its butt portion is deflected substantially. Accordingly, when a large fish is caught, the overall fishing rod including the butt portion is deflected substantially, so that the distance from the butt portion being gripped by the angler to the rod tip becomes short, so that the load of the bending moment applied to the angler becomes small, and fishing is therefore made very comfortable. That is, in this application, attention is focused on the fact that the crush breakage can be prevented if a solid rod is used, and the fishing rod down to the butt portion can be deflected substantially by adoption of the solid rod, thereby making it possible to effect comfortable fishing.

A third aspect of the present invention is a fishing rod comprising: a solid rod in which a coating film is provided on a surface of a tip portion of a solid member using a resin as a matrix and reinforced mainly by reinforced fibers generally oriented in an axial direction, the solid rod having a region where a prepreg which mainly uses as axially reinforced fibers carbon fibers having a modulus of elasticity of a magnitude less than or equal to a modulus of elasticity of the carbon fibers and has a resin ratio smaller than a resin ratio of the solid member is wound around and integrated with a surface of the solid member excluding the tip portion.

If the solid member is used, a rod having a small diameter is generally formed, but the prepreg wound around this solid member has a resin ratio smaller than the resin ratio of the solid member. Therefore, if the same flextural rigidity is to be obtained, the diameter of the fishing rod can be made small and light weight can be achieved by winding the prepreg rather than forming the fishing rod by the solid member alone. Since the modulus of elasticity of the axially oriented reinforced fibers of the wound prepreg is less than or equal to the modulus of elasticity of the axially oriented reinforced fibers used in the solid member, a sharp change in the rigidity of the rod at a boundary portion of prepreg winding can be prevented. For this reason, pliability is smooth, the concentration of stress is difficult to occur, and the strength improves. At the same time, since the axially oriented reinforced fibers are mainly formed from carbon fibers of the same kind, for instance, even if the solid member is heat-formed in advance, and is subsequently heated together with the wound prepreg, since the difference in the coefficient of linear expansion is small, the distortion or bending of the formed basic material can be prevented. In addition, in a case where the tip portion of the solid member is formed into a tapered shape by grinding and polishing, the axially oriented reinforced fibers in the vicinity of the surface become cut, but since a coating film is provided on the surface of the tip portion of the solid member which is located in this cut region, it is possible to prevent peeling off and fracturing.

DETAILED DESCRIPTION OF THE PREFERRED EMBODIMENT

Figure 1:
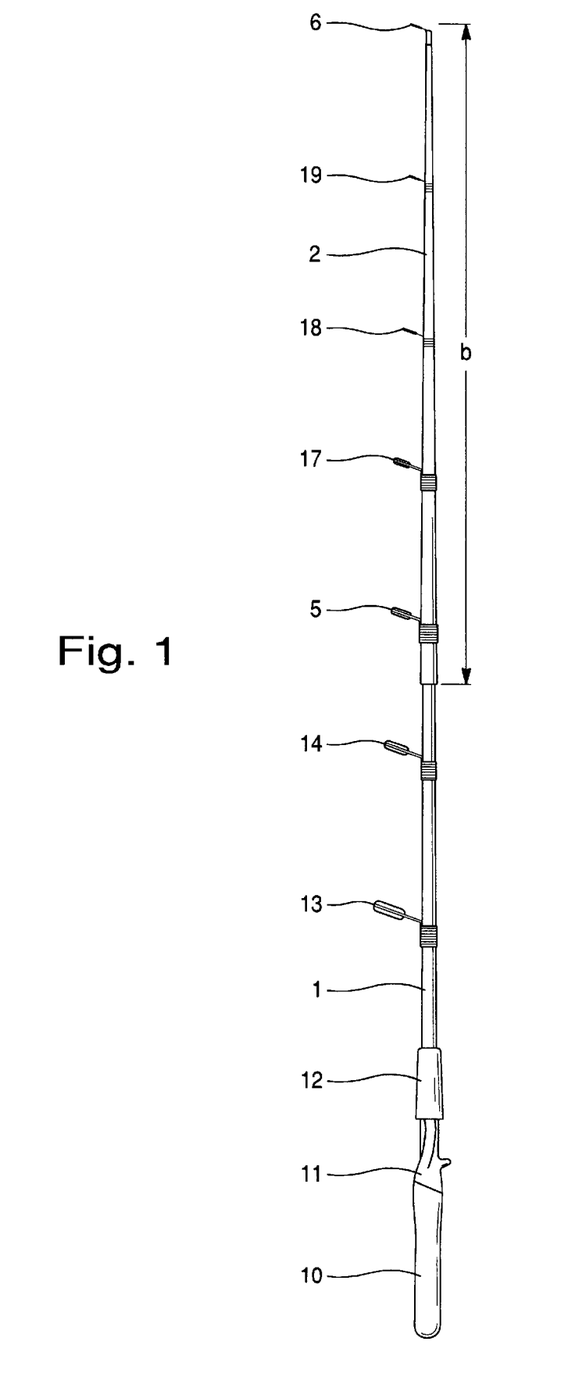
FIG. 1 is a side elevational view of a joined-type fishing rod in accordance with a first embodiment.
Figure 2:
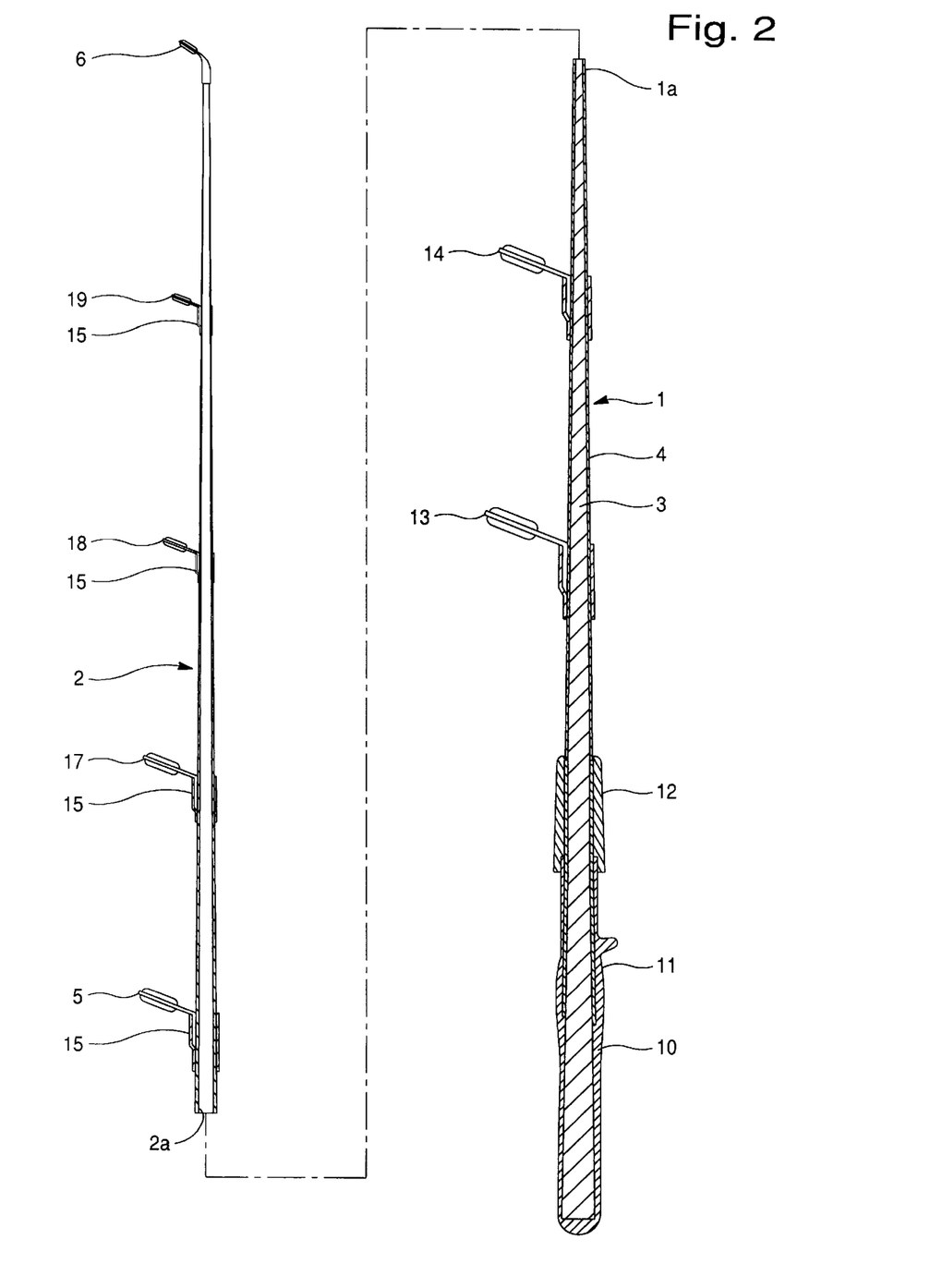
FIG. 2 is an exploded side cross-sectional view of the joined-type fishing rod.
Figure 3:
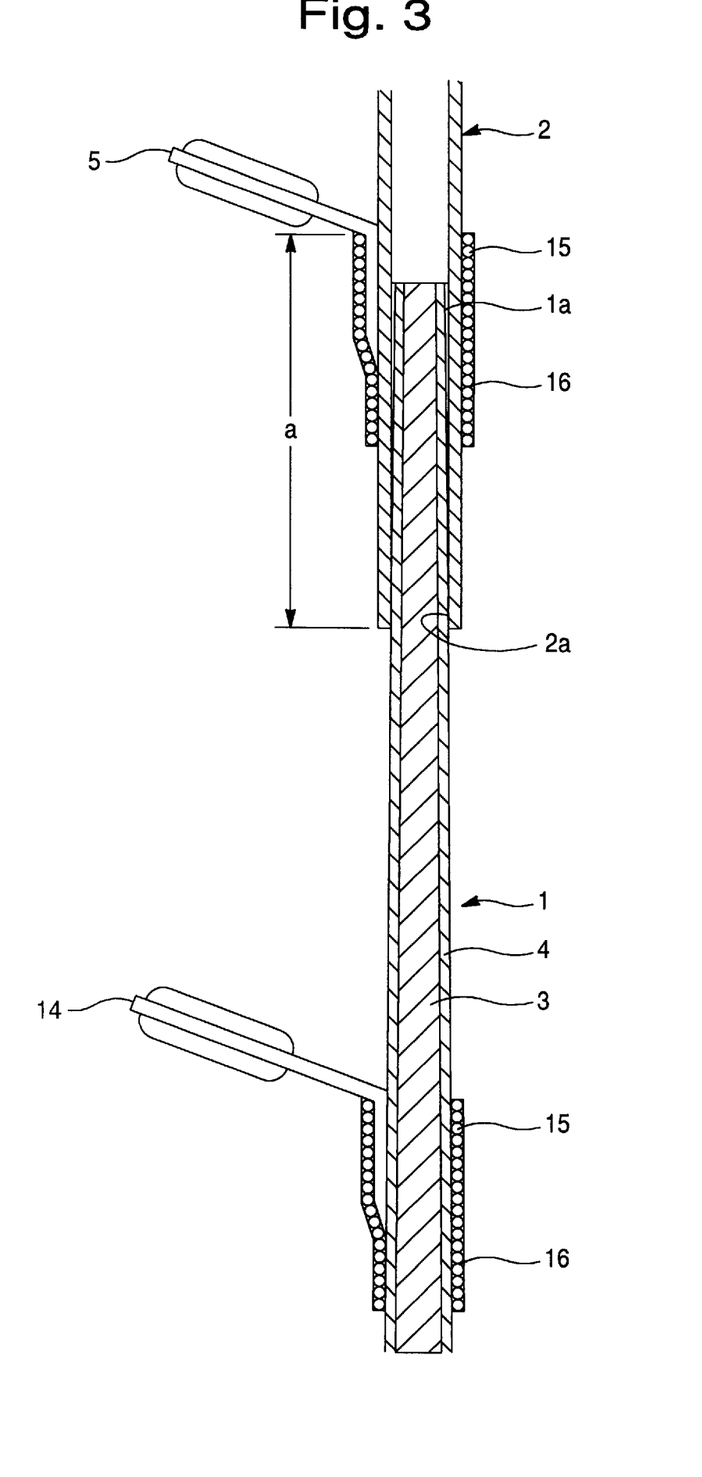
FIG. 3 is an enlarged side cross-sectional view of a joining portion thereof.
Figure 4:
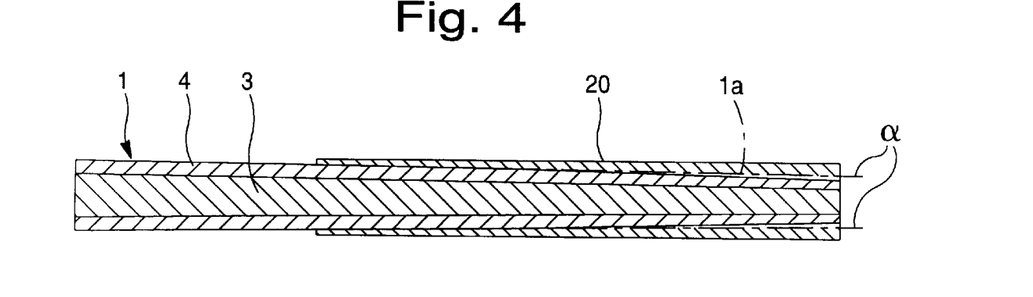
FIG. 4 is an enlarged side cross-sectional view of a digital end of a solid rod thereof in the process of being manufactured.

Hereafter, a description will be given of embodiments of the present invention with reference to the drawings. FIGS. 1 to 4 illustrate a first embodiment, in which FIG. 1 is a side elevational view of a joined-type fishing rod; FIG. 2 is an exploded side cross-sectional view of the joined-type fishing rod; FIG. 3 is an enlarged side cross-sectional view of a joining portion; and FIG. 4 is an enlarged side cross-sectional view of a distal end of a solid rod in the process of being manufactured.

A joined-type fishing rod is arranged such that a tip rod 2 shaped in the form of a hollow rod pipe is joined to a distal end of a butt rod 1 shaped in the form of a solid rod.

The butt rod 1 is arranged such that a prepreg is wound around an outer periphery of the solid rod 3 to form the outer layer 4 in an integrally superposed form, or the butt rod is formed by the solid rod 3 alone. A grip 10, a reel-leg mounting member 11, and a grip 12 are secured to the outer periphery of the solid rod 3 on the butt aide. Line guides 13 and 14 are fixed to the butt rod 1 by winding strings 15 therearound at positions between the grip 10 and a distal-end joining portion 1a, and the strings 15 are secured by a synthetic resin material 16.

A joining portion 2a is formed on an inner periphery of the tip rod 2 on the butt side, and line guides 5 and 17 are fixed to the outer periphery of the tip rod 2 on the butt side by winding the strings 15 therearound, while line guides 18 and 19 are fixed to the outer periphery forwardly of the line guide 17 by winding the strings 15 therearound.

The line guide 5 is provided forwardly of the distal end of the solid rod 3 joined to the tip rod 2.

A line top guide 6 is secured to the distal end of the tip rod 2.

The outer periphery of the tip rod 2 on the butt side is formed in such a manner as to be able to accommodate the distal end of the butt rod 1 by a length a.

The length a is preferably larger than or equal to 30 mm.

The overall length b of the tip rod 2 is formed to be substantially half the overall length of the joined-type fishing rod.

For this reason, the tip rod 2 is strong against large deflection, and since the tip rod 2 is formed from a hollow rod pipe, the tip rod 2 does not hang down heavily when the fishing rod is held.

When the solid rod 3 of the butt rod 1 is formed, carbon fibers of high-strength fibers are tied, are impregnated with a thermosetting resin, such as epoxy resin, phenol resin, and polyester resin, and are formed by thermosetting treatment in accordance with the conventional method.

When the tip rod 2 is formed, after a prepreg sheet, in which a woven cloth or the like reinforced by high-strength carbon fibers is impregnated with a thermosetting resin, such as epoxy resin, phenol resin, and polyester resin, is wound around an unillustrated core by an appropriate number of turns, taping is provided on the outer side thereof, the assembly is placed in a heating furnace, and is formed by thermosetting treatment in accordance with the conventional method.

As the elasticity of the aforementioned carbon fibers, 30 t/mm$^2$ is respectively used.

When the outer layer 4 is formed integrally around the outer periphery of the solid rod 3 of the butt rod 1, after a prepreg sheet, in which a woven cloth or the like reinforced by high-strength carbon fibers is impregnated with a thermosetting resin, such as epoxy resin, phenol resin, and polyester resin, is wound around the outer periphery of the preformed solid rod 3 by an appropriate number of turns, taping is provided on the outer side thereof, and the assembly is placed in the heating furnace, and is formed by thermosetting treatment in accordance with the conventional method.

Around the outer periphery of the distal end of the outer layer 4 of the butt rod 1, a prepreg sheet, in which a woven cloth or the like reinforced by high-strength carbon fibers is impregnated with a thermosetting resin, such as epoxy resin, phenol resin, and polyester resin, is wound by an appropriate number of turns, then taping is provided on the outer side thereof, and the assembly is placed in the heating furnace, and is formed by thermosetting treatment in accordance with the conventional method, thereby forming an outer covering layer 20. After the treatment, the outer covering layer 20 is subjected to grinding processing at a joining taper line shown in FIG. 4, thereby forming the joining portion 1a.

When the above-described joined-type fishing rod is used, and a large fish is caught and the fishing rod is deflected substantially, the distal end side of the butt rod 1 and the tip rod 2 are deflected, and the catch is fished up.

If the joined-type fishing rod is arranged as described above, since the butt rod 1 is formed by the solid rod 3 and the outer layer 4 or by the solid rod 3, the butt rod 1 can be made a slender butt rod, and the tip rod 2 which is joined to the butt rod 1 can also be made a slender tip rod. As a result, the overall joined-type fishing rod becomes slender, so that the fishing rod operation such as a casting operation is easy to perform.

Moreover, since the tip rod 2 is hollow, it is possible to prevent a heavy hanging down of the rod when the fishing rod is held.

Further, even when a large fish is caught, since the butt rod 1 is formed by the solid rod 3 and the outer layer 4 or by the solid rod 3, it is possible to obtain a tough and high-strength fishing rod which is capable of coping with large deflection and preventing breakage.

In the foregoing description, as the elasticity of the aforementioned carbon fibers, 30 t/mm$^2$ is respectively used, but 40 t/mm$^2$–65 t/mm$^2$ may be used for the solid rod 3, 20 t/mm$^2$–50 t/mm$^2$ may be used for the outer layer 4, and 20 t/mm$^2$–65 t/mm$^2$ may be used for the tip rod 2.

If 40 t/mm$^2$–65 t/mm$^2$ is used for the solid rod 3, 20 t/mm$^2$–50 t/mm$^2$ is used for the outer layer 4, and the elasticity of the outer layer 4 is made lower than that of the solid rod 3, it is possible to obtain a tensile, lightweight, and high-strength fishing rod.

If the elasticity of the tip rod 2 is made lower than that of the butt rod 1, the diameter can be enlarged, and light weight can be attained.

If the elasticity of the butt rod 1 is made lower than that of the tip rod 2, the fishing rod can be formed into one which has a small diameter and a sharp condition, as in the case of a fourth embodiment.

Figure 5:
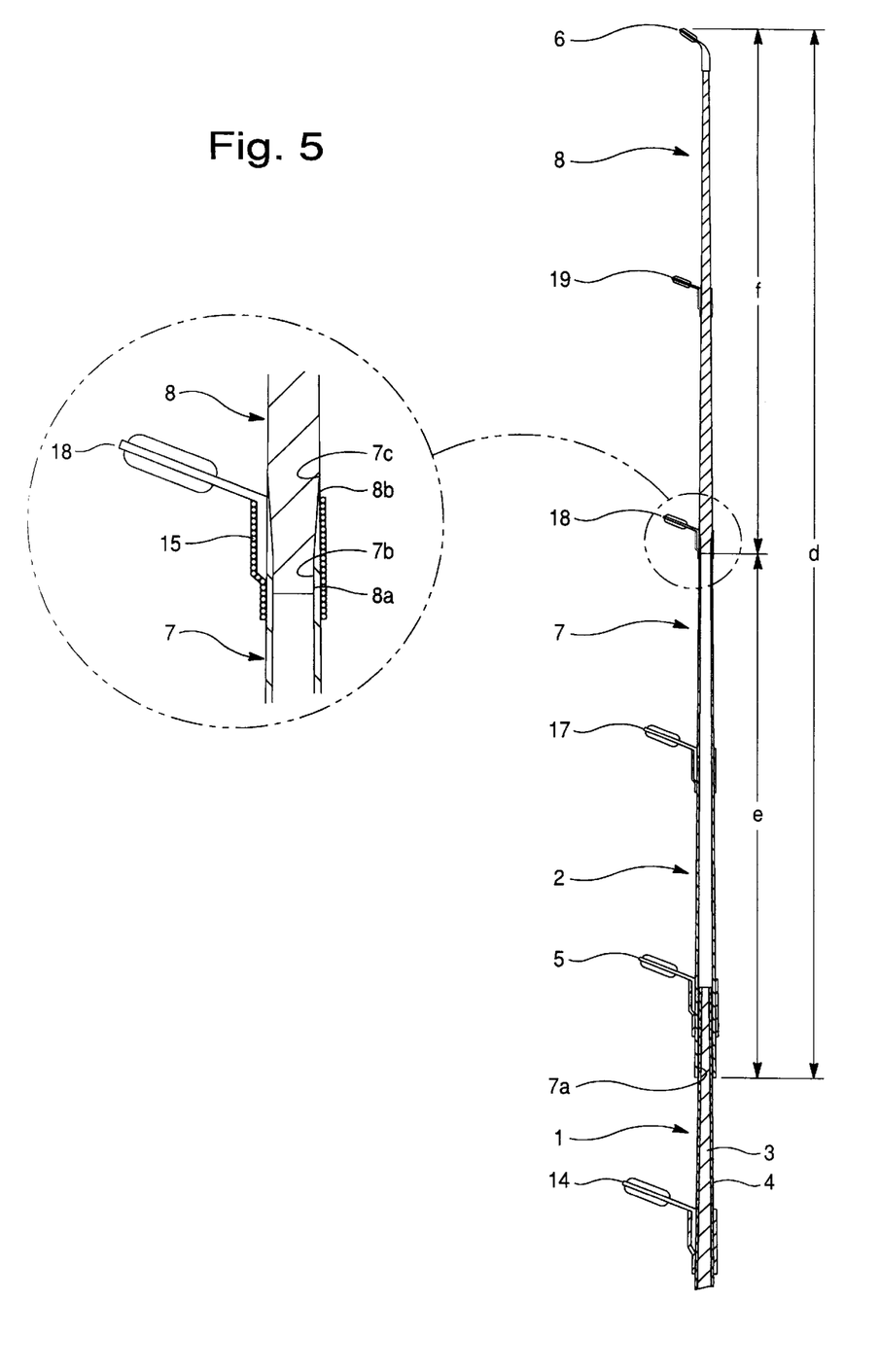
FIG. 5 shows a second embodiment and is a side cross-sectional view of a joined-type fishing rod in which a distal end side of the tip rod is formed from a solid rod, as well as a partially enlarged side cross-sectional view.

FIG. 5 shows a second embodiment and is a side cross-sectional view of a joined-type fishing rod in which a distal end side of the tip rod is formed from a solid rod, as well as a partially enlarged side cross-sectional view.

In the second embodiment, a tip rod 2' is formed by joining and fixing of a hollow rod pipe 7 and a solid rod 8.

The joint between the tip rod 2' and the butt rod 1 is substantially of the same type as in the above-described first embodiment, and a joining portion 7a on the inner periphery on the butt side of the hollow rod pipe 7 of the tip rod 2' is joined to the joining portion 1a on the outer periphery of the outer layer 4 of the butt rod 1.

As the fixing structure for joining the hollow rod pipe 7 and the solid rod 8, the hollow rod pipe 7 side is formed by winding a prepreg around the outer periphery of the solid rod 8.

The fixing and joining portion of the hollow rod pipe 7 is formed by a straight portion 7b and a tapered portion 7c on an inner periphery of its distal end.

The fixing and joining portion of the solid rod 8 is formed by a small-diameter straight portion 8a and a tapered portion 8b.

A line guide 9 is fixed to an outer periphery of the fixing and joining portions of the hollow rod pipe 7 and the solid rod 8 by winding the string 15 therearound, and the string 15 is secured by the synthetic resin material 16.

The length d of the tip rod 2' is formed to be the length e of the hollow rod pipe 7 plus the length f of the solid rod 8.

The length f of the solid rod 8 is set to be 50% or less, preferably 30% to 10%, of the length d of the tip rod 2'.

The solid rod 8 is preferably used on the distal end side of the tip rod whose condition is soft.

By so doing, the tip rod is capable of undergoing large deflection, and the strength of the distal end side of the tip rod can be improved.

As the elasticity of the carbon fibers of the solid rod 8, 5 t/mm$^2$–65 t/mm$^2$ is used.

If the elasticity of the carbon fibers of the solid rod 8 is set to a low elasticity of 5 t/mm$^2$–24 t/mm$^2$, the solid rod 8 easily undergoes large deflection, so that breakage can be prevented.

The other arrangements are substantially identical to those of the above-described first embodiment.

Figure 6:
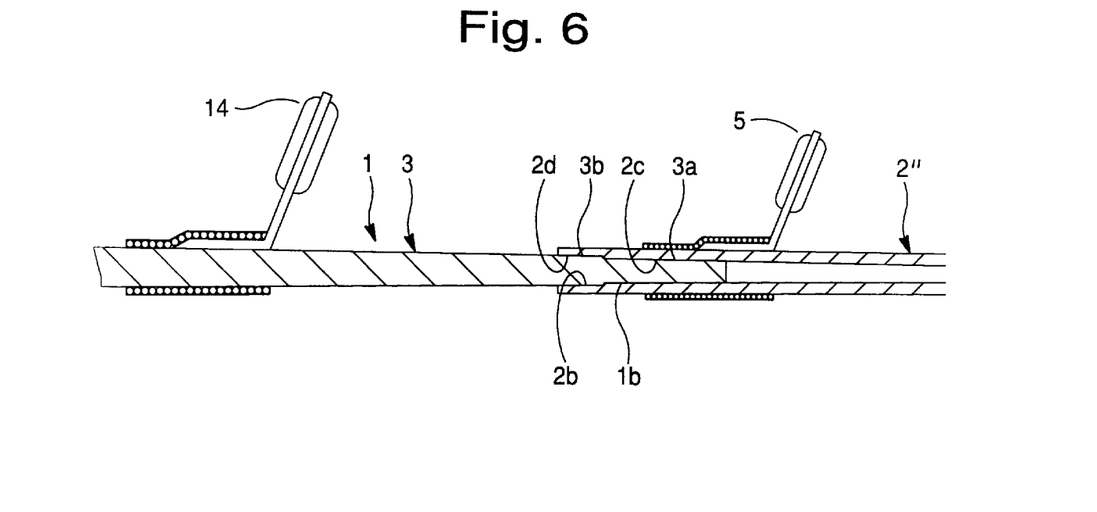
FIG. 6 shows a third embodiment and is an enlarged side cross-sectional view of an essential portion of a joined-type fishing rod in which the but rod is formed from a solid rod.

FIG. 6 shows a third embodiment and is an enlarged side cross-sectional view of an essential portion of a joined-type fishing rod in which the but rod is formed from a solid rod.

In the third embodiment, the butt rod 1 is formed from the solid rod 3.

At a distal end of the solid rod 3, a joining portion 1b is formed by a small-diameter gently tapered portion 3a and a large-diameter gently tapered portion 3b.

A joining portion 2b of the tip rod 2 formed of a hollow rod pipe is joined to the joining portion 1b of the solid rod 3.

The joining portion 2b is formed from a gently tapered portion 2c and a large-diameter gently tapered portion 2d on the inner periphery of the butt side of the tip rod 2.

The other arrangements are substantially identical to those of the above-described first embodiment.

If the butt rod 1 and the tip rod 2 are formed as in the third embodiment, the fishing rod can be made more slender than in the above-described first embodiment.

Figure 7:
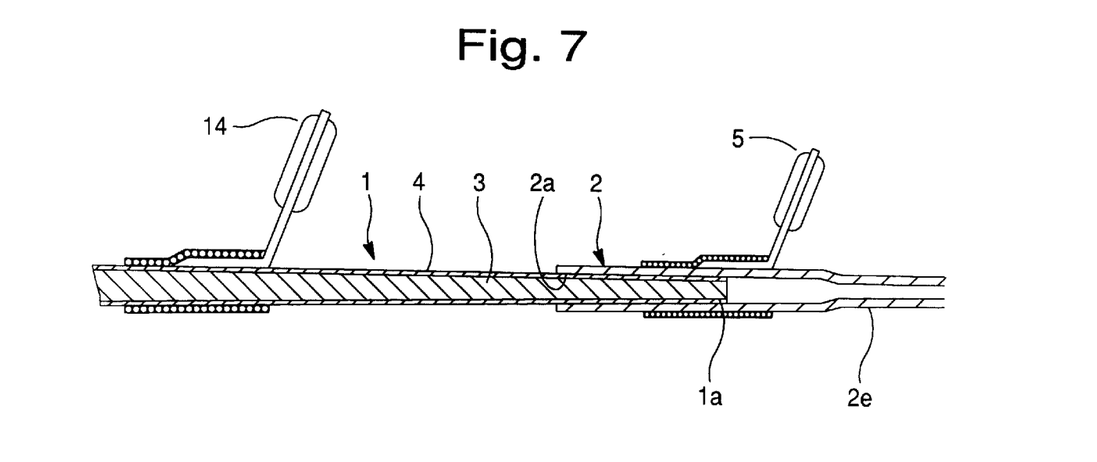
FIG. 7 shows a fourth embodiment and is an enlarged side cross-sectional view of an essential portion of a joined-type fishing rod.

FIG. 7 shows a fourth embodiment and is an enlarged side cross-sectional view of an essential portion of a joined-type fishing rod.

A tip rod 2" in the fourth embodiment is an example in which the elasticity of the carbon fibers is set to 65 t/mm$^2$, and a portion located forwardly of the joining portion 2a is formed as a small-diameter portion 2e, and a portion located forwardly thereof is formed with a small diameter.

The other arrangements are substantially identical to those of the above-described first embodiment.

If the tip rod is formed with a small diameter as in the case of the tip rod 2" in the fourth embodiment, the fishing rod can be formed as one exhibiting a sharp condition.

These embodiments demonstrates advantages which are described below.

Since the butt rod is formed by the solid rod and is made a slender butt rod, and the tip rod which is joined to the butt rod can also be made a slender tip rod. As a result, the overall joined-type fishing rod becomes slender, so that the fishing rod operation such as a casting operation is easy to perform.

Moreover, since the tip rod is hollow, it is possible to prevent a heavy hanging down of the rod when the fishing rod is held.

Further, even when a large fish is caught, since the butt rod is formed by the solid rod, it is possible to obtain a tough and high-strength fishing rod which is capable of coping with large deflection and preventing breakage.

Figure 8:
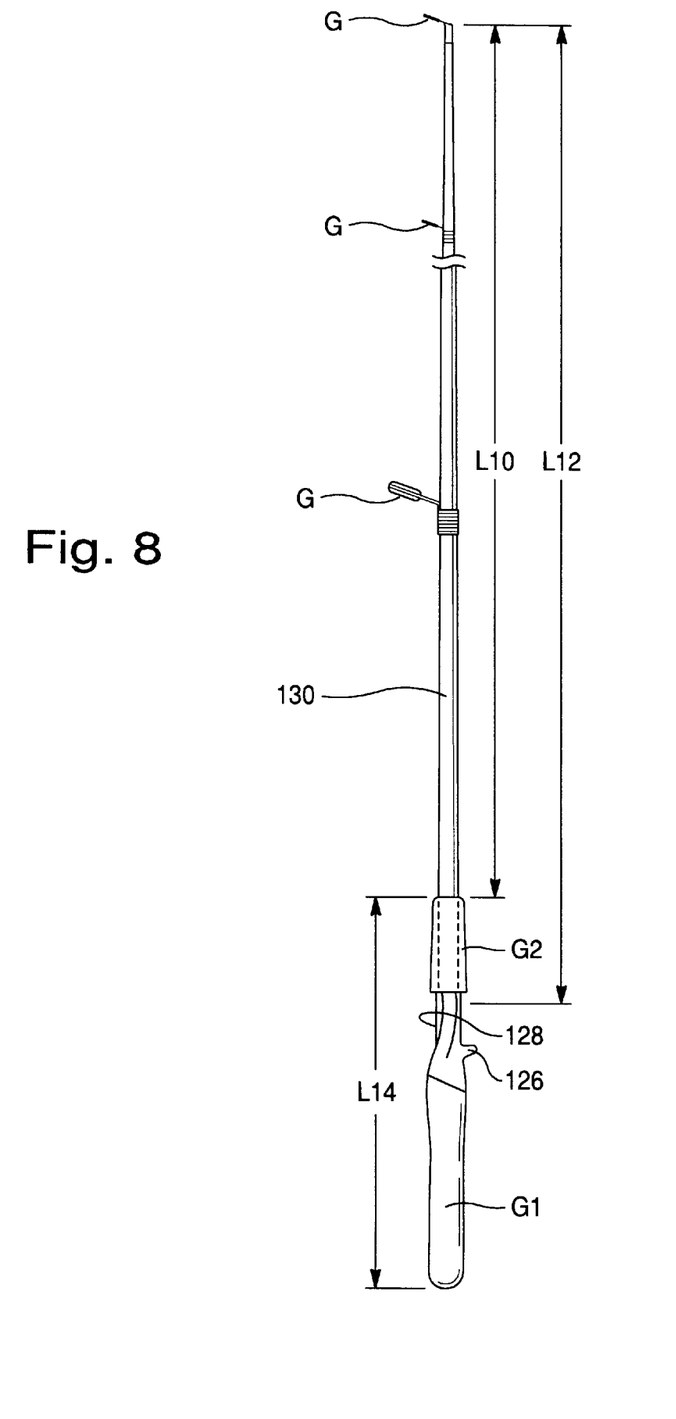
FIG. 8 shows a fifth embodiment and is a side elevational view of a fishing rod.

FIG. 8 shows a casting rod as a fifth embodiment of a fishing rod in accordance with the present invention. The portion of a region L14 is a handle portion, and its front-side region L10 is the region where deflection is expected to take place. In light of connection with the handle portion, a solid rod 130 is used over the range of a length L12, and a butt portion thereof is inserted and fixed in the handle portion, but a structure may be adopted such that the solid rod 130 is inserted over the entire length of the fishing rod including the handle portion L14. The handle portion has a rear-side grip G1 and a front-side grip G2, and a reel mounting portion 128 is provided between the two grips. The front-side grip G2 is threadedly secured, and a reel is mounted or removed by being rotated. Reference 126 denotes a trigger, and G denotes a line guide.

Figure 9:
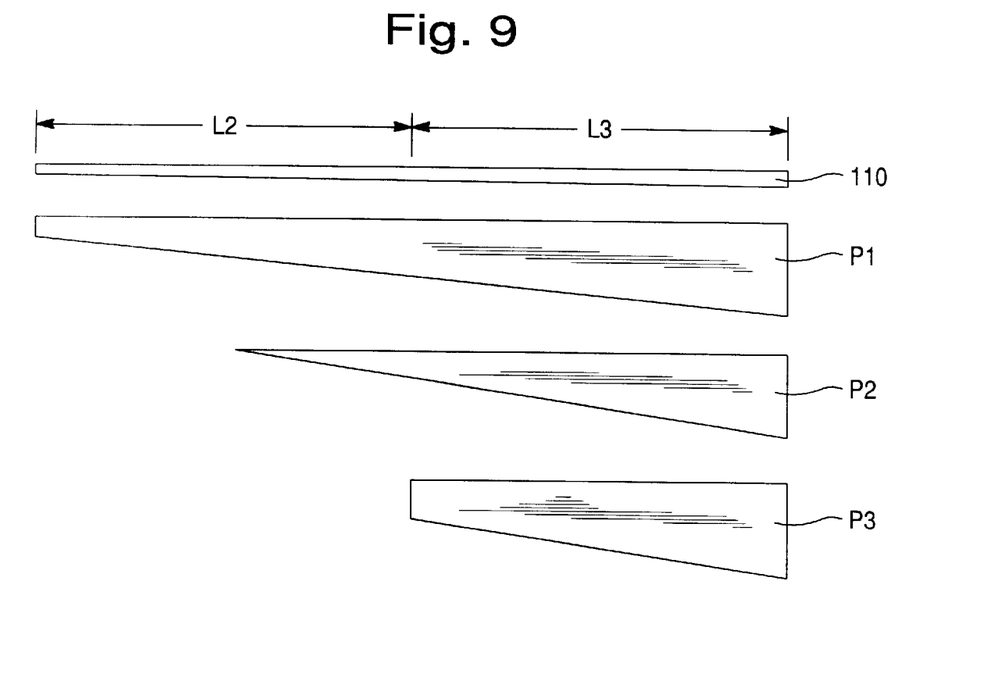
FIG. 9 is a diagram for explaining a method of manufacturing the fishing rod shown in FIG. 8.

Referring to FIG. 9, a description will be given of a method of manufacturing the aforementioned solid rod 130. First, a solid member 110 in which reinforced fibers are oriented substantially in the axial direction. As for the solid member 110 in this embodiment, its butt region L3 has a generally straight shape, and its tip region L2 has a tapered shape, but the overall solid member 110 may have a tapered shape. An illustrated trapezoidal prepreg sheet P1 is wound around the overall surface of the solid member from its tip to a rear end, and then an illustrated triangular prepreg sheet P2 is wound around the entire region L3 and a portion of the region L2. Further, an illustrated trapezoidal prepreg sheet P3 is wound around the region L3. Subsequently, the components of the solid rod 130 thus prepared are subjected to heat forming while being pressurized by a tightening tape or the like.

Most of the reinforced fibers of each prepreg sheet are oriented substantially in the axial direction. The moduli of elasticity of these axially oriented reinforced fibers are made larger in the ascending order of the prepreg P1, the prepreg P2, and the prepreg P3. The modulus of elasticity of the prepreg P1 is set to be slightly smaller than or equal to that of the axially oriented reinforced fibers of the solid member 110, or to be intermediate between that of the solid member 110 and that of the prepreg P2. The modulus of elasticity of the prepreg P2 is made larger than that of the prepreg P1, and larger than that of the solid member. The modulus of elasticity of the prepreg P3 is made larger than that of the prepreg P2 and larger than that of the solid member. In addition, the resin ratios of the prepregs P2 and P3 are made smaller than the resin ratio of the solid member, i.e., their fiber ratios are made larger. These fiber ratios are used to attain light weight by a small number of prepreg windings, and ensure deflection rigidity.

As for the prepregs, it is preferable to use thin prepreg sheets each having a thickness of about 0.1 mm or less in the light of preventing of the occurrence of bending in the rod material during forming and the like due to the nonuniformity (partial thickness) in the circumferential direction of the prepreg windings.

In the above-described example, the prepreg P1 may not be used. That is, the prepreg may not be wound up to the tip of the solid member. In addition, since the prepregs having the aforementioned shapes are wound, the number of windings at the butt portion becomes large, and the diameter of the butt portion becomes large in the region L3 as well, so that the formed rod as a whole assumes a tapered shape.

In the above-described example, carbon fibers are used as the main reinforced fibers of the solid member, and their modulus of elasticity is 24 tons/mm$^2$. The main reinforced fibers of the prepregs are also carbon fibers, the modulus of elasticity of the prepreg P1 being 20 tons/mm$^2$, the modulus of elasticity of the prepreg P2 being 30 tons/mm$^2$, and the modulus of elasticity of the prepreg P3 being 40 tons/mm$^2$. The reinforced fibers of the solid rod 30 may be 100% carbon fibers. By so doing, the deflection rigidity of the rod can be easily made high, and can be provided with high strength and relatively light weight, and since they are one kind of fibers, the difference in the coefficient of linear expansion is small, and the bending of the rod is difficult to occur during heat forming. In this case, all the resin used is epoxy resin, but it is also possible to use other resins together with other reinforced fibers. The modulus of elasticity of the reinforce fibers of the solid member is preferably selected from 50 tons/mm$^2$ or below. The reason for this is that the strength does not decline substantially. Accordingly, the modulus of elasticity of the reinforce fibers of the solid member is selected from 20, 24, 30, 40, and 50 tons/mm$^2$, while that of each prepreg is selected from the range of 5–80 tons/mm$^2$. In the case of carbon fibers of 50 tons/mm$^2$, pitch-based fibers may be used. The fibers of the solid member may also be selected arbitrarily from the range of 5–80 tons/mm$^2$.

The length L12 of the solid rod is set to be 1.8 m or more, preferably 2.0 or more, and the rod should preferably be formed as a one-piece rod, as shown by way of example. The reason for this is that the rod can be provided with high strength for its large pliability. Nevertheless, in this case, the solid member may be structured such as to be formed into one piece by connecting the solid member at a certain longitudinal position thereof or such that prepregs are connected at a certain longitudinal position thereof. Circumferential oriented reinforced fibers in an amount necessary for the prevention of fracturing of the solid rod 130 which has deflected by a large degree may be disposed around a layer on the outer periphery of the solid member 110 (i.e., around some prepreg).

The resin ratio of each prepreg which forms each outer layer of the solid rod 130 can be made smaller than the resin ratio of the solid member 110, which is a central portion, by 10 wt % or more, i.e., the ratio of the volume of reinforced fibers is increased by that portion, thereby making it possible to improve the deflection rigidity and strength for the light weight of the solid rod 130. The resin ratio (wt %) of the solid member is set to be 25 or more and 50 or less, preferably 28 or more and 40 or less, and each prepreg sheet is selected from 10 or more and less than 28.

Nevertheless, the aforementioned resin ratio between the solid member and the prepreg sheet may be reversed. By so doing, the flexibility of the solid rod 130 can be improved. In addition, as the reinforced fibers of the prepreg sheets, fibers with a small modulus of elasticity, such as glass fibers, may be used instead of the carbon fibers, or the reinforced fibers are oriented in the circumferential direction or in an inclined direction irrespective of the kind of fibers, thereby making it possible to improve the flexibility.

Figure 10:
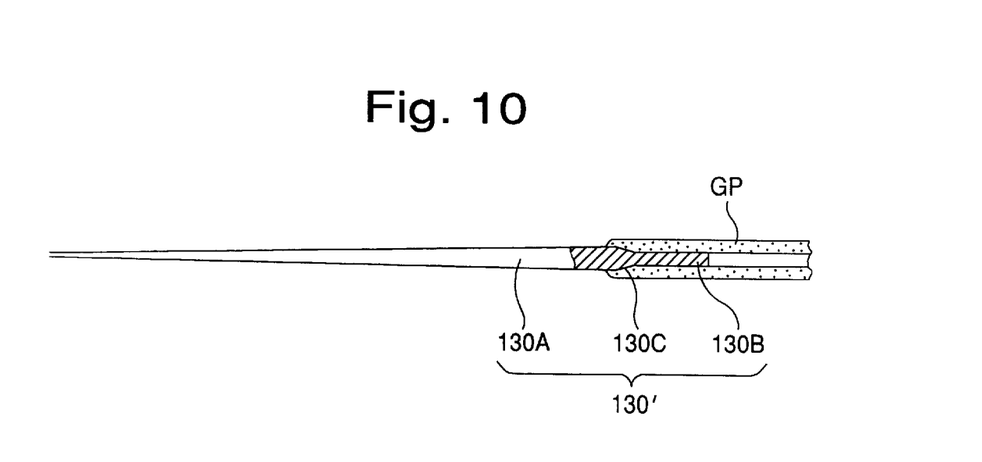
FIG. 10 is a diagram of an essential portion of another form of the fishing rod shown in FIG. 8.

In FIG. 10, the arrangement in shape is provided such that the diameter of a butt portion 130B of the solid rod is made small to allow a solid rod 130' to be inserted into and connected to a grip GP (or the handle portion), and the butt portion 130B and a rod main body portion 130A projecting from the grip GP and having a tapered shape are connected together by a reversely tapered portion 130C. This small-diameter butt portion 130B may remain in the form of the solid member 110, or a prepreg sheet may be wound therearound. Further, light weight can be attained if, as in the case of the solid rods shown in FIGS. 8 and 10, the butt portion 130B is inserted into only the front portion of the handle portion or the grip portion, and a portion located rearwardly thereof is formed to be hollow.

Figure 11:
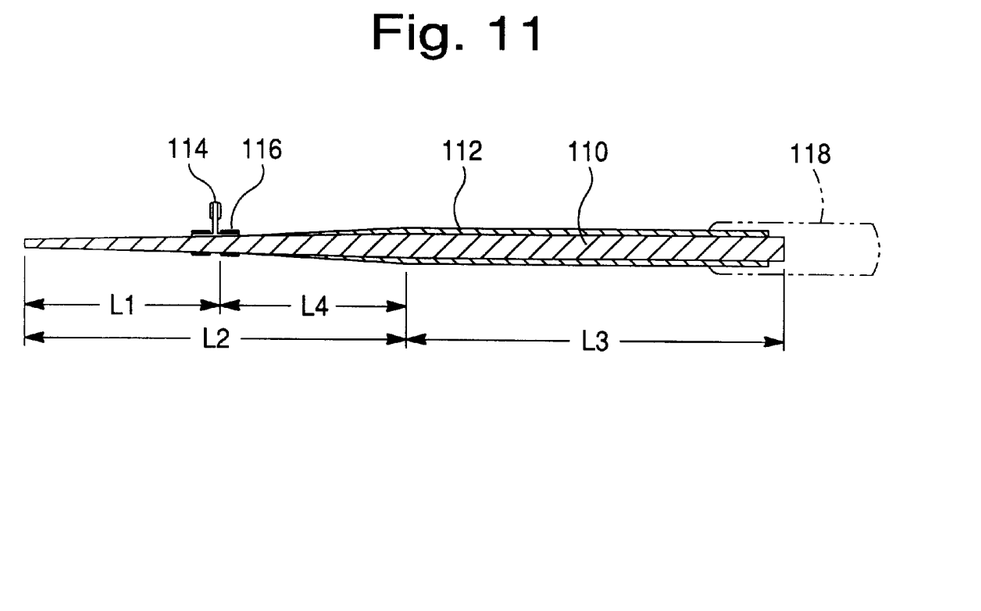
FIG. 11 shows a sixth embodiment, and is a longitudinal sectional view of a fishing rod.
Figure 12:
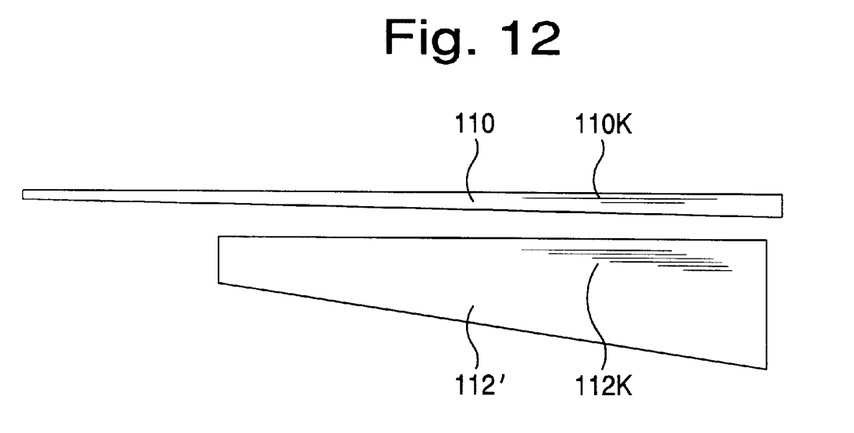
FIG. 12 is a diagram for explaining a method of manufacturing the fishing rod shown in FIG. 11.

FIG. 11 shows a longitudinal cross-sectional diagram of a fishing rod using the solid member in accordance with a sixth embodiment of the present invention. In addition, FIG. 12 is an explanatory diagram of a method of forming a solid rod of the fishing rod shown in FIG. 11. Longitudinally oriented reinforced fibers 110K are formed of carbon fibers, and the solid member 110 is formed in advance by sintering by using epoxy resin as one example of a matrix resin. Depending on its sintered configuration, the region L2 from an intermediate portion to the tip is formed into a tapered shape by grinding and polishing. In this came, the remaining region L3 has a straight shape or a gentle tapered shape. Subsequently, a prepreg sheet 112' cut into a trapezoidal shape is wound around a butt portion of this solid member 110 over a predetermined range, and this preform is subjected to heating and sintering again at 140° C. for 70 minutes, for example, thereby forming a solid rod 130" in which a wound prepreg layer 112 is formed integrally on the surface of the solid member 110.

Carbon fibers having a smaller modulus of elasticity than the aforementioned carbon fibers 110K are used as axially reinforced fibers 112K used in this prepreg 112', and epoxy resin which is the same kind of resin is used as the resin, but the resin ratio differs. For instance, the resin ratio of the solid member is 28–40 wt %, and the resin ratio of the prepreg is 10–28 wt %. In addition, although heat hardening processing is effected in two stages, the solid member and the prepreg can be easily integrated since resins of the same kind are used. In addition, since the axially reinforced fibers are carbon fibers in both cases, the difference in the coefficient of linear expansion is small, so that the bending deformation of the solid rod material cooled after heat forming is difficult to occur.

A handle portion 118 in which, for example, a cork material or a foamed material is used as the grip portion is bonded and secured to a rear-end portion of this solid rod. In addition, in this example, an unillustrated reel mounting member is provided on the handle portion.

The wound prepreg layer 112 is not formed in a tip region L1 of the solid rod, and this region remains in the form of the sintered solid member 110, or is in a state in which that solid member 110 is ground and polished. Here, a resin coating is provided on an overall front region located forwardly of the handle portion 118, including the tip region of the solid rod, so that even if the carbon fibers of the axially reinforced fibers at the surface portion are cut by grinding and polishing, the occurrence of peeling off and fracturing is prevented since they are coated. In addition, although the illustration does not show a state in which the wound prepreg layer 112 is formed down to the rear end of the solid member 110, the wound prepreg layer 112 may be formed down to the rear end.

Since the modulus of elasticity of carbon fibers of the axially reinforced fibers of the solid member 110 is large, and that of the wound prepreg layer 112 is small, a sudden change in the rigidity before and behind a boundary portion between the tip region L1 and this wound prepreg layer 112 can be prevented, and the deflection can be made smooth. At the same time, it is possible to prevent the concentration of stress and the breakage.

Further, in this embodiment, a log portion of a line guide 114 is disposed in such a manner as to extend before and behind the aforementioned boundary portion, and this leg portion is fixed by winding a string 116 therearound. As a result, this boundary portion is reinforced, and the breakage at this portion is prevented more effectively.

The concentration of stress can be prevented more effectively if the dimensions and the shape of the prepreg 112' are devised, and the prepreg layer 112 in the vicinity of the aforementioned boundary portion is formed with a small thickness as practically as possible, while a portion located rearwardly thereof is formed with a large thickness, i.e., if the prepreg sheet is formed in a trapezoidal shape with such dimensions that a portion of the prepreg sheet in the vicinity of the boundary portion is wound once, while the number of windings of the rearward portion is increased Further, the length of the tip region L1 should preferably be set to less than half the length of the solid member 110, and in this embodiment the length of the tip region L1 is about half the length of the tapered region L2. In a case where grinding and the like are provided, the wound prepreg layer 112 in the region L4 in the drawing serves to prevent the peeling off of cut fibers at the surface of the solid member.

Although the prepreg 112' is formed as one sheet in the above-described embodiment, an arrangement may be provided such that another prepreg, which has carbon fibers as axially reinforced fibers whose modulus of elasticity is larger than that of the carbon fibers 112K of the prepreg 112' under the condition of being less than or equal to the modulus of elasticity of the carbon firers 110K of the solid member, is arranged with its distal edge set more on the butt side than that of the prepreg 112', and is wound around the prepreg 112' in a superposed manner, and these members may then be formed integrally by heat forming. By so doing, the rod can be made more slender under the conditions in which the same flextural rigidity is obtained. Although the above-described arrangement is preferable, an arrangement may be provided such that another prepreg, which has carbon fibers and the like as axially reinforced fibers whose modulus of elasticity exceeds that of the carbon fibers 110K of the solid member, is arranged with its distal edge set more on the butt side than the prepreg 112', is wound around the prepreg 112' in a superposed manner, and is subjected to heat forming.

As described above, it becomes possible to provide a fishing rod with which, even when fishing large fish or fish demonstrating strong tugs, fishing can be performed comfortably even if the angler's physical strength is small.

Further, it becomes possible to provide a fishing rod having a solid rod in which the deflection before and behind the front edge of the prepreg wound around the solid member is smooth, the concentration of stress is difficult to occur, and the bending of the formed basic material is difficult to occur. Moreover, the diameter of the fishing rod can be reduced, and light weight can be achieved.

What is claimed is:

1. A fishing rod comprising:
   a solid butt rod having a grip and a reel leg mounting member secured to a grip end of said solid butt rod, said solid butt rod extending substantially from said grip to a distal end opposite to said grip end;
   a hollow rod joined to said distal end of said solid butt rod, said hollow rod being detachable from said solid butt rod; and
   a plurality of line guides provided on said solid butt rod and said hollow rod, respectively.

2. A fishing rod according to claim 1, wherein an elasticity of said hollow rod is lower than an elasticity of said solid rod.

3. A fishing rod according to claim 1, wherein said hollow rod has a length substantially one half of a length of said fishing rod.

4. A fishing rod according to claim 1, wherein an outer surface of said distal end of said solid butt rod is engaged with an inner surface of said hollow rod.

5. A fishing rod according to claim 1, wherein said solid butt rod is formed in a fully solid state from said grip end to said distal end.

6. A fishing rod comprising:
   a handle having a grip end and a reel leg receiving portion;
   a solid rod connected to said handle, and having a distal end;
   a hollow rod joined to said distal end of said solid rod, said hollow rod being detachable from said solid rod; and
   a plurality of line guides provided on said solid rod and said hollow rod, respectively wherein said solid rod penetrates inside of said handle and extends to said grip end so that said solid rod is formed integral with said handle.

7. A fishing rod according to claim 6, wherein said solid rod is joined to said hollow rod in such a manner that an outer surface of said solid rod is contacted with an inner surface of said hollow rod.

8. A fishing rod according to claim 6, wherein said hollow rod is slidably detachable from said solid rod in a longitudinal direction of said hollow rod.

9. A fishing rod comprising:
   a solid butt rod having a grip end and a distal end opposite to said grip end; and
   a hollow rod joined to said distal end of said solid butt rod, said hollow rod being detachable from said solid butt rod; and
   a plurality of line guides provided on said solid butt rod and hollow rod at desired intervals,
   wherein said hollow rod has a joint opening for inserting said distal end of said solid butt rod, and a closest one of said line guides of said hollow rod to said joint opening is spaced apart from said joint opening thereof by more than 30 cm.

10. A fishing rod comprising:
    a butt rod having a distal end, said butt rod formed of an inner solid rod and an outer layer, said inner solid rod formed of a fiber reinforced resin, wherein an elasticity of said outer layer is lower than an elasticity of said inner solid rod, and wherein the outer layer is formed of a fiber reinforced resin; and
    a hollow tip rod joined to said distal end of said butt rod.

11. A fishing rod comprising:
    a butt rod having a distal end, said butt rod formed of an inner solid rod and an outer layer, said inner solid rod formed of a fiber reinforced resin, wherein an elasticity of said outer layer is lower than an elasticity of said inner solid rod; and
    a hollow tip rod joined to said distal end of said butt rod;
    wherein said hollow tip rod is formed of fiber reinforced resin, said inner solid rod of said butt rod is formed with carbon fibers having an elasticity within a range of 40–65 t/mm$^2$, said outer layer is formed with carbon fibers having an elasticity within a range of 20–50 t/mm$^2$, and said tip rod is formed with carbon fibers having an elasticity within the range of 20–65 t/mm$^2$.

12. A fishing rod comprising:
    a butt rod having a distal end, said butt rod formed of an inner solid rod and an outer layer, said inner solid rod formed of a fiber reinforced resin, wherein an elasticity of said outer layer is lower than an elasticity of said inner solid rod; and
    a hollow tip rod joined to said distal end of said butt rod;
    wherein an outer coating layer is disposed about said outer layer end of said butt rod, said outer coating layer is formed of a fiber reinforced resin.

13. A fishing rod comprising:
    a butt rod having a distal end, said butt rod formed of an inner solid rod and an outer layer, said inner solid rod formed of a fiber reinforced resin, wherein an elasticity of said outer layer is lower than an elasticity of said inner solid rod; and
    a hollow tip rod joined to said distal end of said butt rod;
    wherein an outer coating layer is disposed about said outer layer of said butt rod proximate said distal end, said outer coating layer is formed of a fiber reinforced resin, said outer coating layer being ground to a tapered shape to substantially conform to a joining section formed on an inner peripheral surface of said tip rod to establish a strong connection between said tip rod and said butt rod.

* * * * *